US009281576B2

(12) United States Patent
Ikonomou

(10) Patent No.: US 9,281,576 B2
(45) Date of Patent: Mar. 8, 2016

(54) PATCH PANEL HAVING CABLE TERMINATING DEVICES WITH WIRING CONTACTS ACCESSIBLE FROM A FRONT FACE OF THE PANEL

(71) Applicant: Konstantinos Ikonomou, Roselands (AU)

(72) Inventor: Konstantinos Ikonomou, Roselands (AU)

( * ) Notice: Subject to any disclaimer, the term of this patent is extended or adjusted under 35 U.S.C. 154(b) by 3 days.

(21) Appl. No.: 14/282,019

(22) Filed: May 20, 2014

(65) Prior Publication Data

US 2014/0342603 A1 Nov. 20, 2014

(30) Foreign Application Priority Data

May 20, 2013 (AU) .............................. 2013 901 778

(51) Int. Cl.
*H01R 43/00* (2006.01)
*H01R 4/24* (2006.01)
*H04Q 1/02* (2006.01)
*H01R 13/506* (2006.01)
*H01R 24/64* (2011.01)

(52) U.S. Cl.
CPC .............. *H01R 4/2433* (2013.01); *H01R 43/00* (2013.01); *H04Q 1/13* (2013.01); *H01R 13/506* (2013.01); *H01R 24/64* (2013.01); *Y10T 29/49169* (2015.01)

(58) Field of Classification Search
CPC ...... H01R 11/30; H01R 13/518; H01R 29/00; H01R 43/00
USPC ............................ 439/38–39, 300, 305, 540.1
See application file for complete search history.

(56) References Cited

U.S. PATENT DOCUMENTS

| 6,302,728 | B1 * | 10/2001 | Conorich et al. ............. 439/501 |
| 7,762,839 | B2 * | 7/2010 | Chen ........................... 439/540.1 |
| 8,025,514 | B1 * | 9/2011 | Wang ............................ 439/172 |
| 2008/0124971 | A1 * | 5/2008 | Hoelzel ...................... 439/540.1 |
| 2011/0189886 | A1 * | 8/2011 | Chen .............................. 439/488 |
| 2011/0256742 | A1 * | 10/2011 | Panella et al. .................. 439/65 |
| 2012/0188865 | A1 * | 7/2012 | Michaelis et al. ............ 370/200 |
| 2013/0196538 | A1 * | 8/2013 | Takeuchi et al. .............. 439/571 |

* cited by examiner

*Primary Examiner* — Chandrika Prasad
(74) *Attorney, Agent, or Firm* — Design IP

(57) ABSTRACT

A patch panel arrangement is disclosed having a two part cable terminating device into which a cable can enter. One part, for example, a main body has forward facing wiring contacts. The cable can pass through from the rear but has its wires terminated on the wiring contacts from the front. A front cover detachable from the main body via the front of the patch panel, exposes the front facing wiring contacts to permit wiring changes to be effected from the uncluttered front of the patch panel (rather than the crowded rear of conventional patch panels).

14 Claims, 10 Drawing Sheets

PATCH PANEL HAVING CABLE TERMINATING DEVICES WITH WIRING CONTACTS ACCESSIBLE FROM A FRONT FACE OF THE PANEL

BACKGROUND OF THE INVENTION

The present invention relates to patch panel arrangements, the devices used to terminate cables in patch panels, and methods of terminating wires of cables leading to patch panels.

Patch panels are widely used in light current electrical engineering and in data and telecommunications applications, in particular, to enable interconnections to be made which may need to be changed in future. Typical reasons for future changes include changes to the configuration of computer and other data systems, expansion of the number of telephone outlets provided at a given premises, and the like.

Patch panels are typically mounted in racks or equivalent mounting structures such as cabinets or other housings having a door or pivoted front panel. Typically the panels are of a standard size and numerous panels are provided stacked one upon the other in a parallel relationship. Each panel has a series of apertures which are normally punched or drilled through the panel and each aperture holds a terminating device which normally takes the form of a multi-contact socket. The openings of the sockets are substantially flush with the front face of the panel. The cables which are connected to the sockets are connected by wiring contacts which are accessible only from the rear face of the patch panel. The rear face of the patch panel often includes a cable tidy or similar tray like device to which the ends of the cable adjacent to the patch panel are connected.

As the number of cables connected to a particular patch panel increases, or the number of cables connected to adjacent patch panels increase, so it becomes increasingly difficult to access the wiring contacts at the rear face of a patch panel to make a further connection, or a number of further connections. This is a fundamental a problem which arises because the volume or space to the rear of the patch panel becomes increasingly congested and filled with cables, cable tidy trays, etc all of which restrict access to the rear of the patch panel. This is a particular problem where the patch panel may be nearly full and yet at some time after the initial installation some further connections are required.

The genesis of the present invention is a desire to substantially overcome, or at least ameliorate, the abovementioned difficulty by providing access to the wiring contacts from the front of the patch panel.

SUMMARY OF THE INVENTION

In accordance with a first aspect of the present invention there is disclosed a patch panel arrangement comprising at least one panel having a front face and a rear face, and having at least one aperture therethrough and means to mount the panel in a rack or equivalent mounting structure, wherein said aperture has a cable terminating device therein having wiring contacts accessible from said panel front face.

In accordance with a second aspect of the present invention there is disclosed a cable terminating device for a patch panel having a front face and a rear face, said device comprising a first member which abuts said rear face, a second member which abuts said front face, and said second member having wiring contacts accessible from said panel front face.

In accordance with a third aspect of the present invention there is disclosed a method of terminating wires of a cable onto a cable terminating device mounted in an aperture of a patch panel having a rear face and a front face, said method comprising the steps of: passing said cable from the rear of said patch panel through a cable opening provided in said terminating device; and passing said cable from the rear of said patch panel through a cable opening provided in said terminating device; and
terminating the wires of said cable in wiring contacts of said device accessible from said patch panel front face.

BRIEF DESCRIPTION OF THE DRAWINGS

Some embodiments of the invention will now be described, with reference to the accompanying drawings in which.

DETAILED DESCRIPTION OF THE PREFERRED EMBODIMENTS

Figure 1:
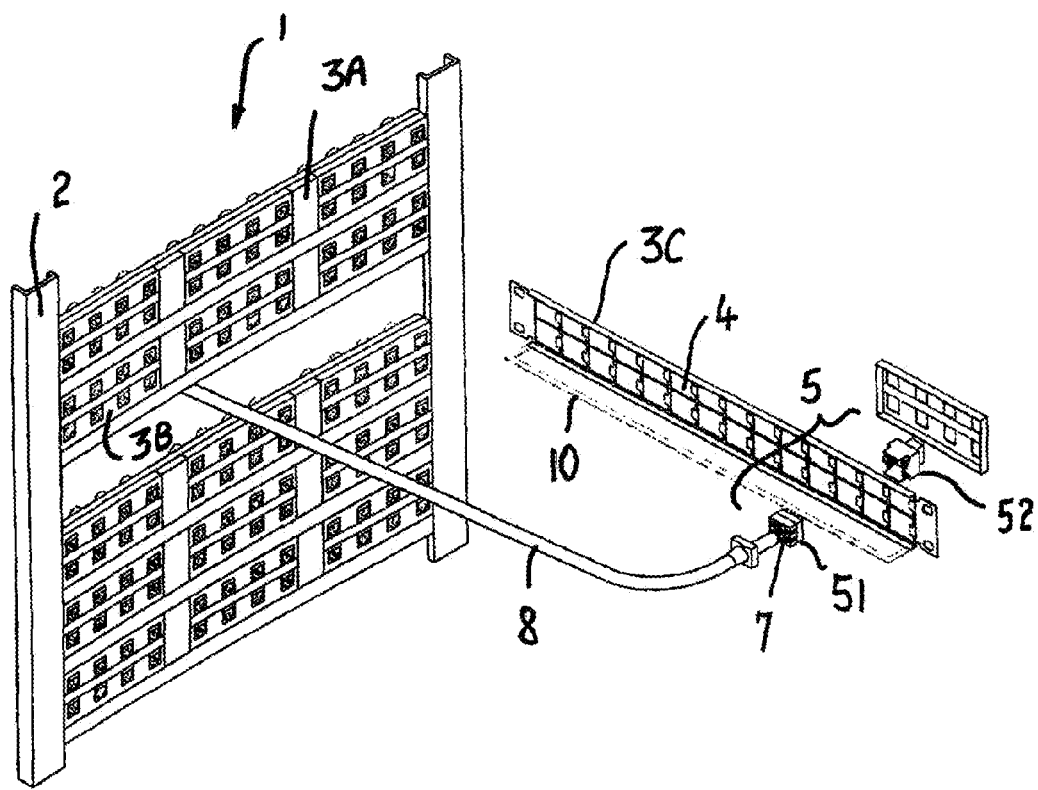
FIG. 1 is a perspective view of the front of a prior art patch panel arrangement, the individual patch panels being mounted in a rack.

As seen in FIG. 1, a patch panel arrangement 1 of the prior art is illustrated which takes the form of a rack 2 on which are mounted eight patch panels 3 (indicated in sequence 3A, 3B, 3C, . . . etc.). One of the patch panels 3C is shown removed from the rack. Each of the patch panels has a plurality of apertures 4 punched therein and each aperture 4 is arranged to take a cable terminating device 5 to which the individual wires 7 of a cable 8 are terminated.

As seen in FIG. 1, the cable terminating device 5 is normally of a two part construction having a main body 51 and a front cover 52. Illustrated in phantom in FIG. 1 is a cable tidy tray 10 to which the cable 8, and other cables (not illustrated) connecting to the patch panel 3C can be secured by means of cable ties (not illustrated), or equivalent arrangements.

Figure 2:
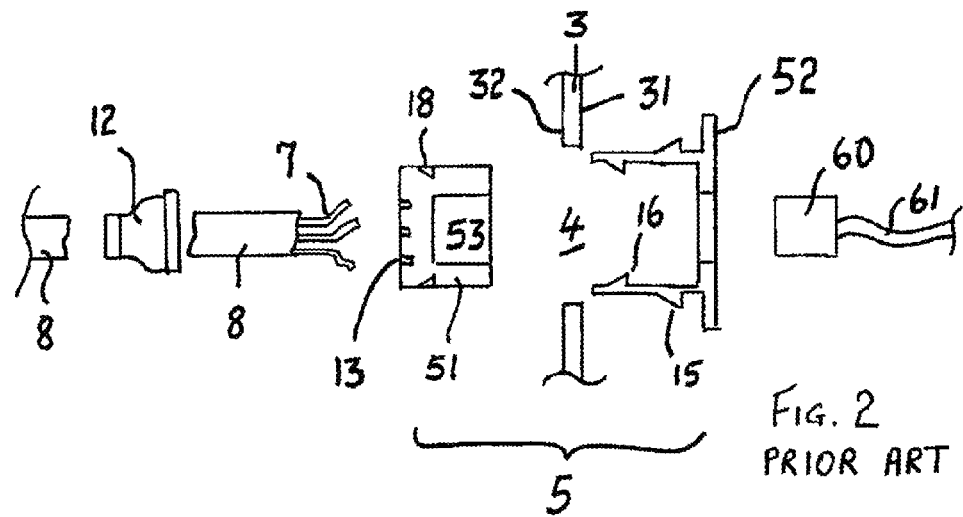
FIG. 2 is a schematic exploded cross-sectional view through the patch panel of FIG. 1.

Turning now to FIG. 2, the cable 8 passes through a cuff or boot 12 and is connected to the main body 51 by means of wiring contacts 13. The patch panel 3C has a front face 31 and a rear face 32. A front cover 52 is provided with two pairs of snap engaging ramps 15 and 16 respectively. The snap engaging ramps 15 enable the front cover 52 to be pushed into the aperture 4 and snap engaged with the patch panel 3C. The snap engaging ramps 16 cooperate with corresponding indentations 18 which therefore enables the main body 51 to be snap engaged with the front cover 52. The cable terminating device 5 has a socket 53 which is connected to the wiring contacts 13. The socket 53 is able to mate with a plug 60 which terminates one end of a lead 61. The entire arrangement enables the cable 8 to be electrically connected to the lead 61.

It will be appreciated from FIGS. 1 and 2 that the wiring contacts 13 are only accessible from the rear of the patch panel 3 and this makes accessing the wiring contacts 13 to make each subsequent connection increasingly more and more difficult as the volume to the rear of the patch panels 3 increasingly becomes filled with cables 8.

Figure 3:
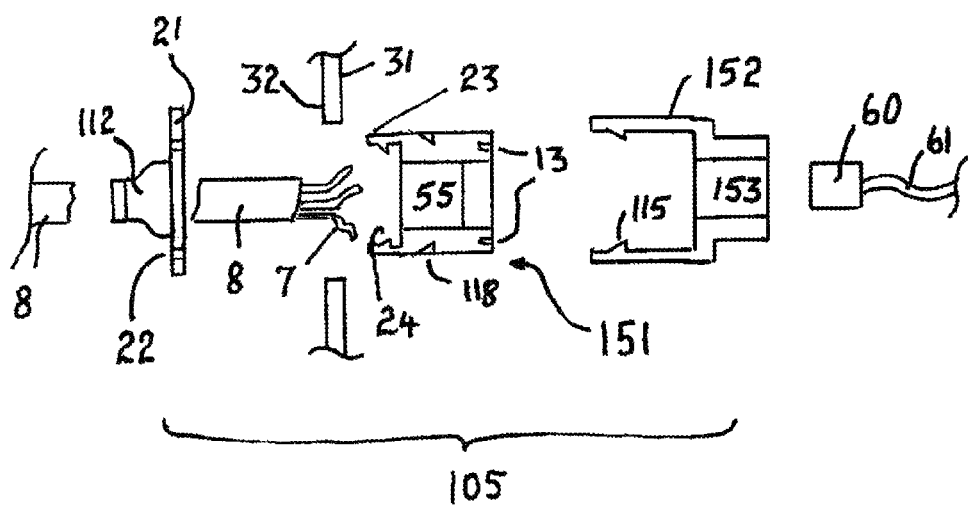
FIG. 3 is a view equivalent to FIG. 2 but illustrating schematically the arrangement of a first embodiment of the present invention.
Figures 4, 5:
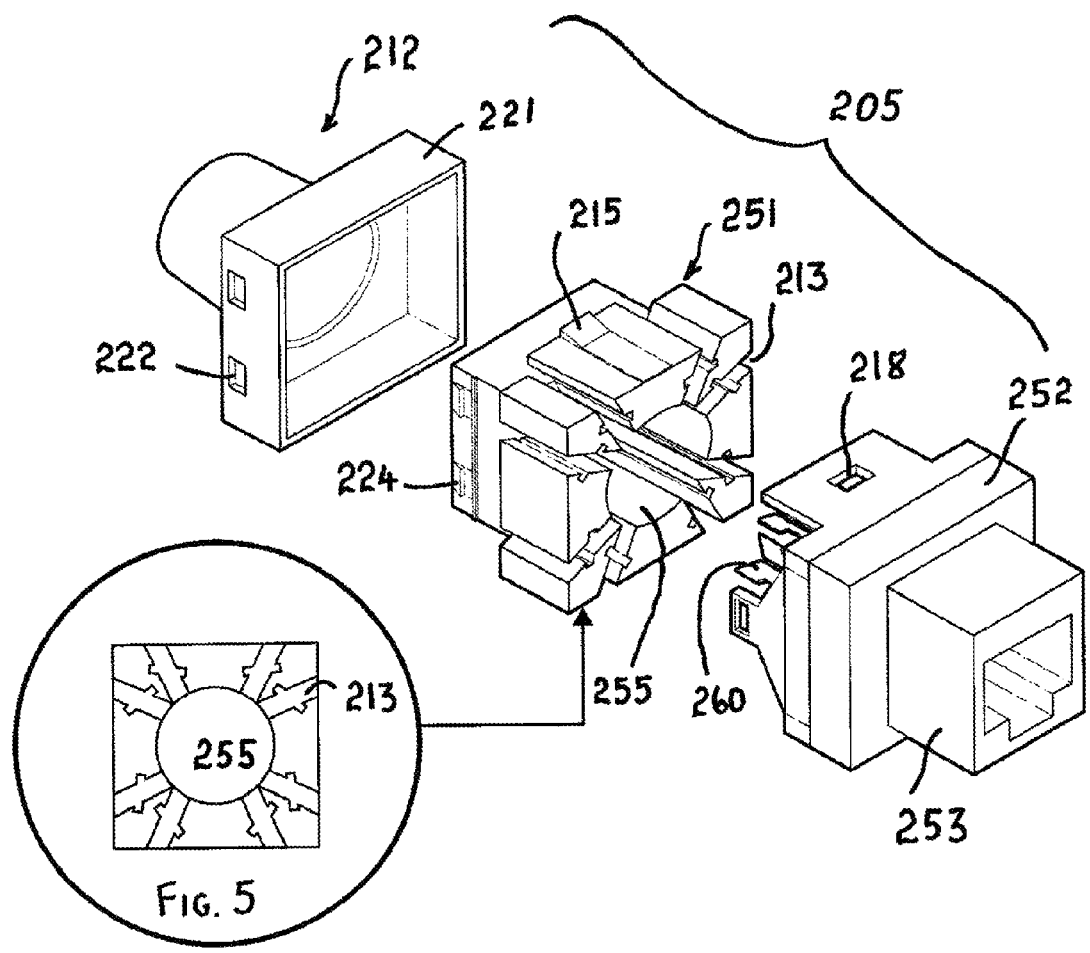
FIG. 4 is a schematic exploded perspective view of a cable terminating device in accordance with a second embodiment of the present invention.
FIG. 5 is a front view of the wiring contacts illustrated in FIG. 4.

A schematic embodiment which substantially overcomes the difficulties of the prior art is illustrated in FIG. 3. The wires 7, cable 8, plug 60 and lead 61 are as in FIG. 2. A cuff or boot 112 is provided with a plate 21 having apertures 22 which are able to receive prongs 23 on the main body 151 of the cable terminating device 105. The prongs 23 are provided with ramps 24 to enable a snap engagement mechanism.

The cable terminating device 105 is provided with a front cover 152 having ramps 115 which engage with indentations 118 in the main body 15. With the ramps 115 engaged with the indentations 118, the front cover 152 is not only engaged with the main body 151, but the inter-engaged parts are held in the aperture 4 because the patch panel 3C is clamped between the plate 21 and the front cover 152.

Importantly, the wiring contacts 113 are provided on the front surface of the main body 151 and the main body 151 has an opening 55 through which the wires 7 are led before being connected to the wiring contacts 13. The front cover 152 has the socket 153 (e.g. RJ45 or similar) which engages the plug 60 and completes the interconnection.

Turning now to FIGS. 4 to 7, a second embodiment of the cable terminating device 205 is illustrated. The cable terminating device 205 has a boot or cuff 212, a main body 251 and a front cover 252. The boot or cuff 212 includes a housing 221 having apertures 222 which engage with ramps 224 on the main body 251. In this way the patch panel 3 is clamped between the housing 221 and the main body 251.

As before, the main body 251 has an opening 255 around which are radially arranged channels 213 which each include an insulation stripping and contact forming cutting blade (not illustrated) which is itself well known in the electrical connection arts.

The main body 251 also has ramps 215 which engage with corresponding apertures 218 in the front cover 252. The front cover 252 is also provided with a conventional socket 253 the internal contacts of which (not illustrated) are connected to corresponding blades 260 which each enter a corresponding one of the channels 213.

Figure 6:
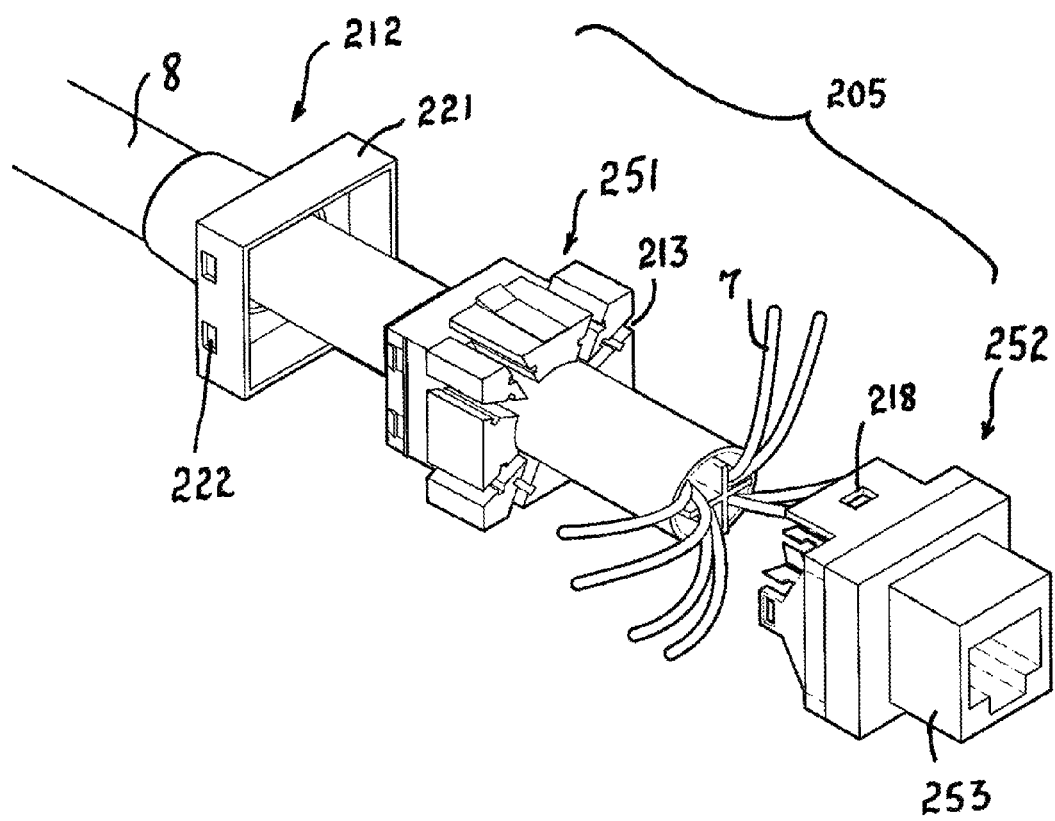
FIG. 6 is an exploded perspective view similar to FIG. 4 but illustrating the method of connecting the wires of the cable.

From FIG. 6 it will be apparent that the cable terminating device 205 can be installed on the patch panel 3 by inter-engagement of the cuff or boot 212 and the main body 251. In this condition with the front cover 252 removed; the cable 8 can be pushed through the cuff or boot 212 and through the opening 255 of the main body 251. Thereafter, the wires 7 can be radially splayed as schematically illustrated in FIG. 6 and brought into the corresponding channels 213 so as to effect the making of the wiring contacts between the wires 7 and the main body 251. Any excess wire is then trimmed so as to enable the front cover 252 to be snap engaged with the main body 251 thereby driving the blades 260 into the corresponding channels 213. This forms the electrical interconnections between the socket 253 and the wires 7.

Figure 7:
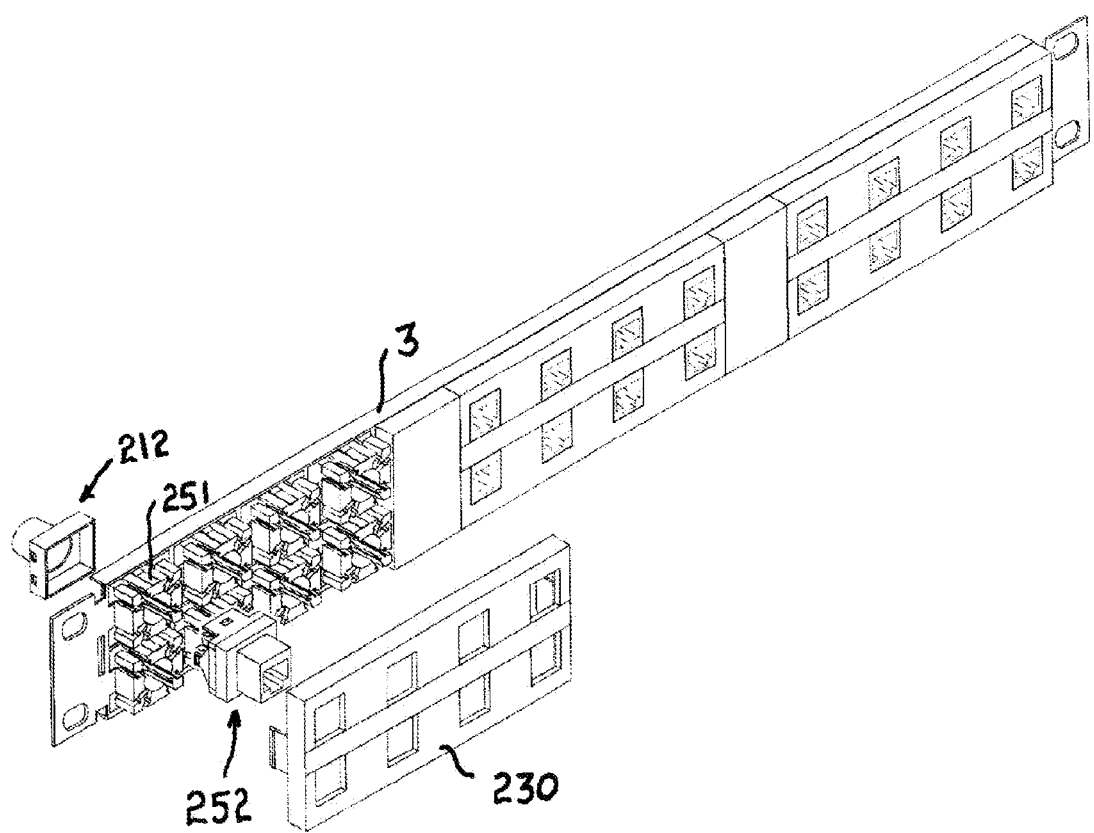
FIG. 7 is a perspective view, partly exploded, of a patch panel fabricated in accordance with the second embodiment of the present invention.
Figure 8:
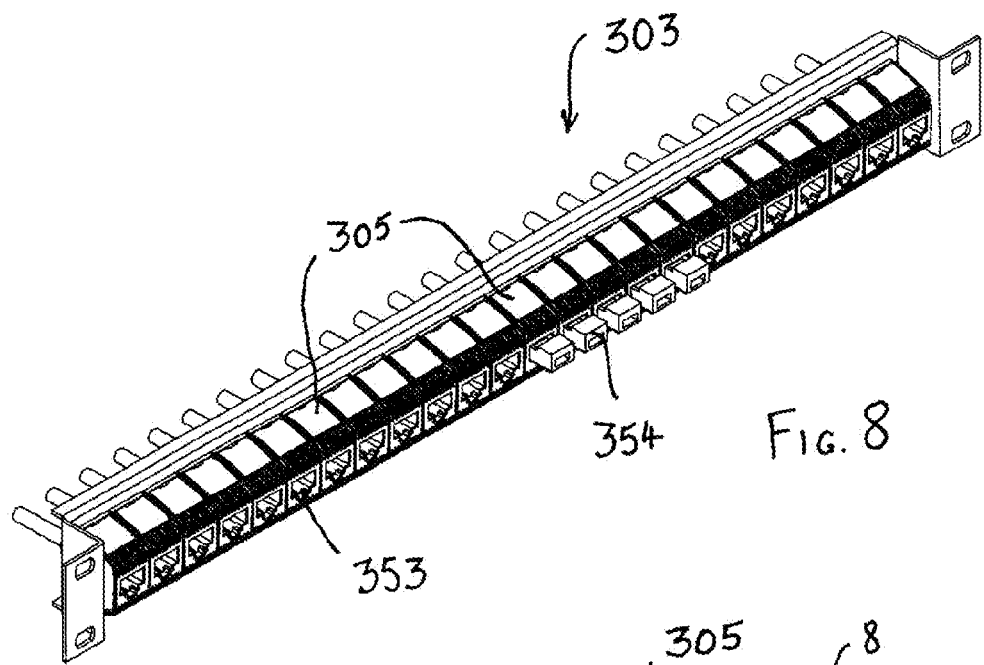
FIG. 8 is a perspective view of a patch panel fabricated in accordance with a third embodiment of the present invention.
Figure 9:
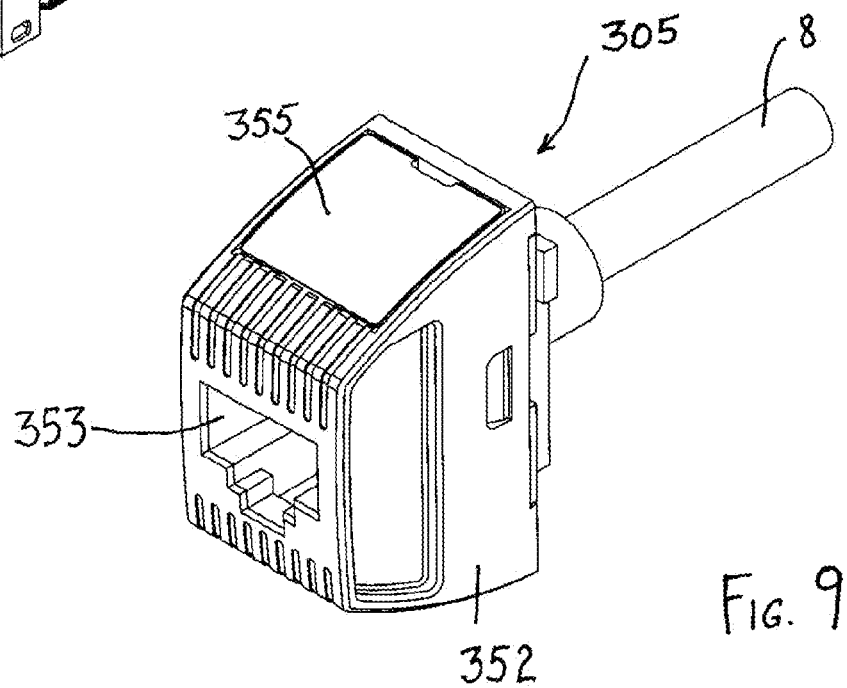
FIG. 9 is a perspective view of the cable terminating device of the third embodiment.
Figure 10:
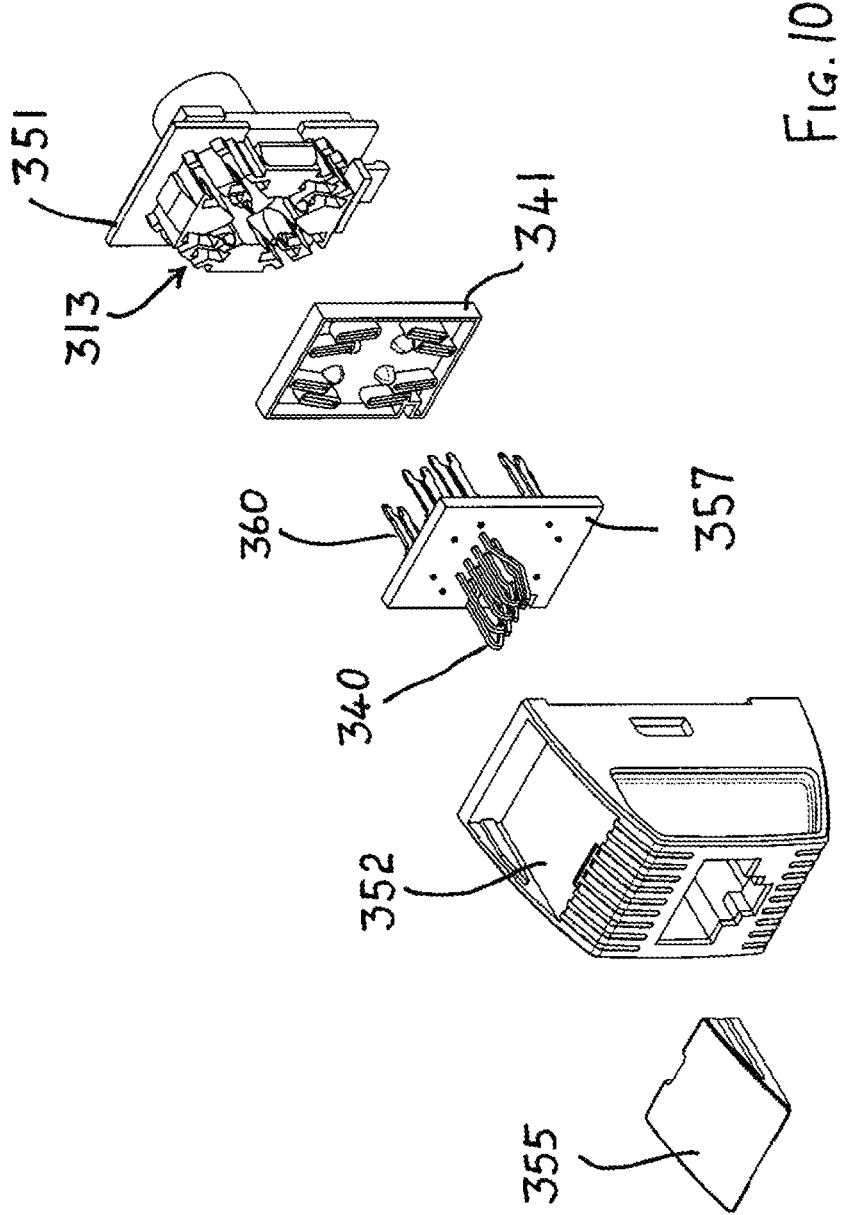
FIG. 10 is an exploded perspective view from the front of the cable terminating device of FIG. 9.
Figure 11:
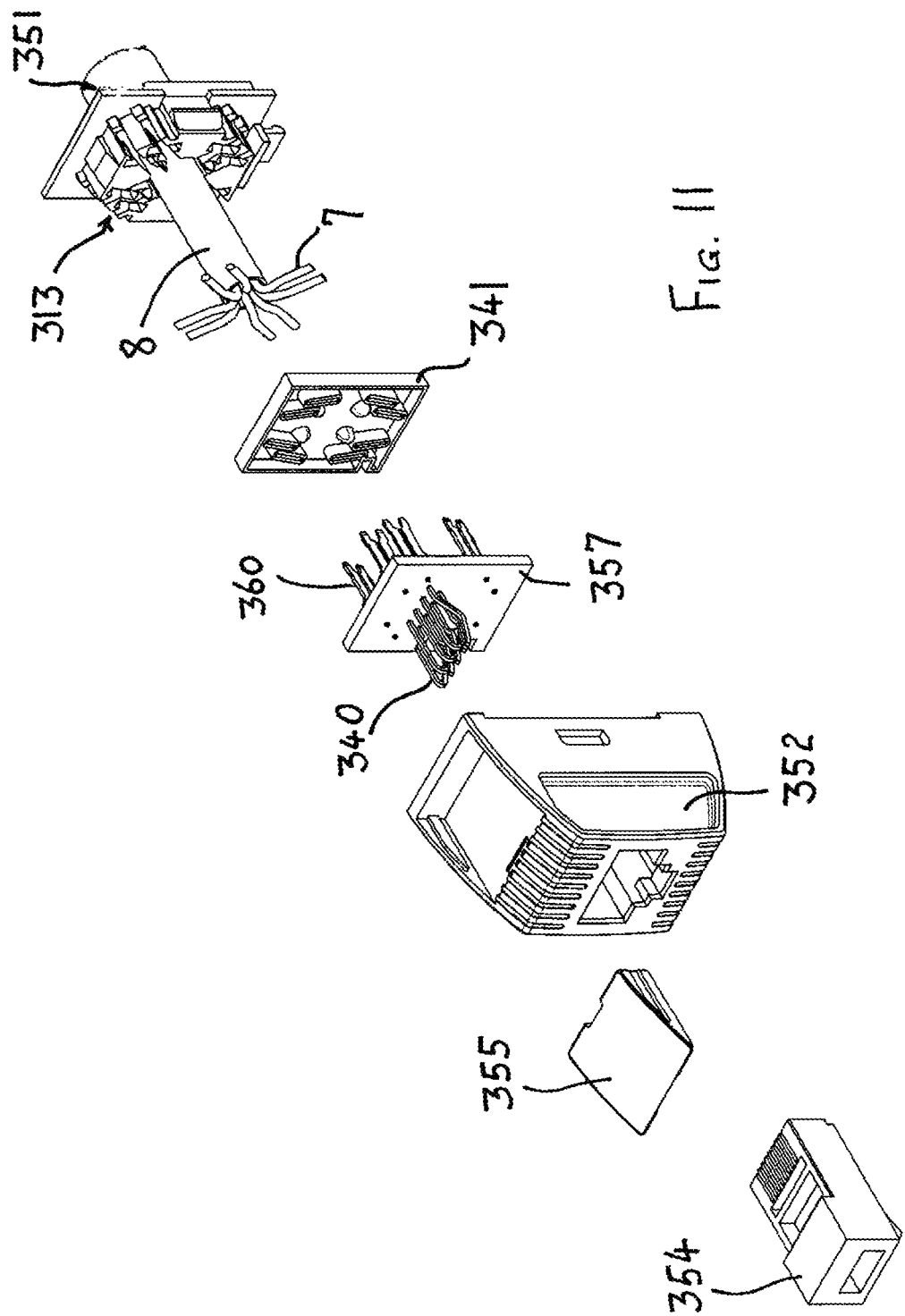
FIG. 11 is the same view of the cable terminating device as in FIG. 10 but illustrating the cable inserted from the rear with the wiring contacts about to be made.
Figure 12:
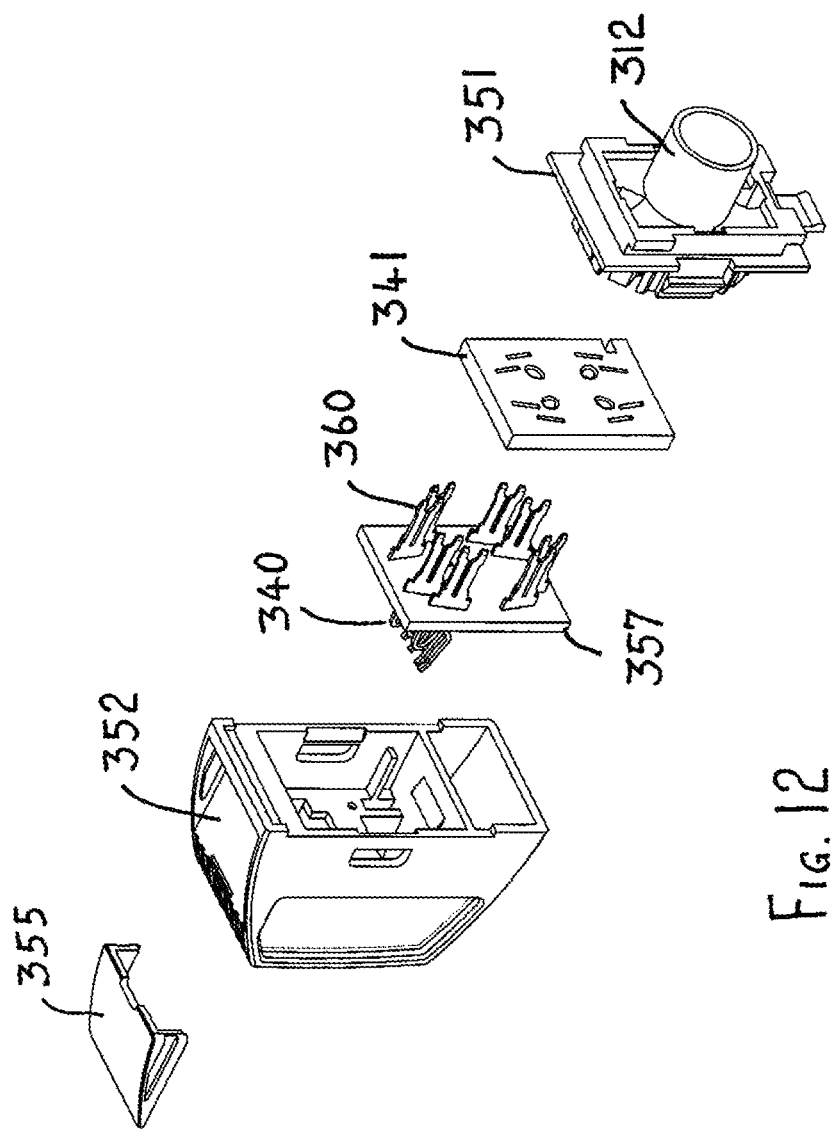
FIG. 12 is an exploded perspective view of the cable terminating device of FIG. 9 but illustrated from the rear.
Figure 13:
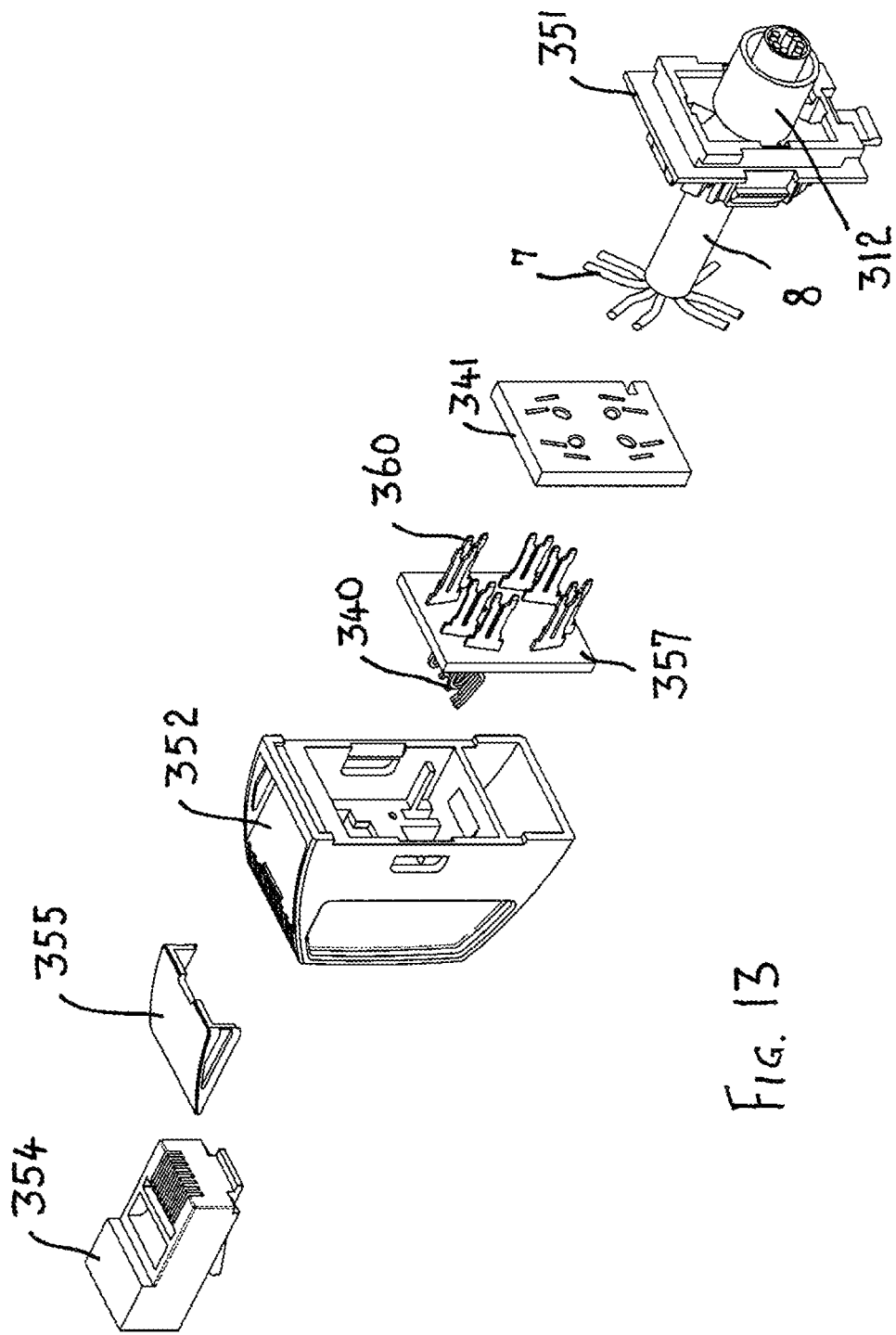
FIG. 13 is the same view of the cable terminating device as in FIG. 12 but illustrating the cable inserted from the rear with the wiring contacts about to be made.

Turning now to FIG. 7, it will be seen that each of the cable terminating devices 205 can be grouped together, preferably in collections of eight. Each such group is covered by a flashing plate 230 which is merely cosmetic.

It will be apparent to those skilled in the art that an additional cable can be installed onto the patch panel illustrated in FIG. 7 at any time, without removing the patch panel from its rack or cabinet. Instead, all that is required to be done from the inside of the rack or cabinet is to push the new cable through the cuff or boot 212 of the corresponding cable terminating device 205. Thereafter, with the flashing plate 230 and the front cover 252 removed, access from the front of the patch panel can be had to the channels 213 containing the wiring contacts and therefore the actual making of the contacts takes place from the front side of the patch panel. Since this work area is entirely uncluttered, ease of operation and assembly so as to make the necessary contacts is ensured, irrespective of the presence or absence of cable connections already made to adjacent cable terminating devices.

A third embodiment is illustrated in FIGS. 8-13. A patch panel 303 is illustrated containing twenty four cable terminating devices 305. One of the cable terminating devices 305 is illustrated in assembled form in FIG. 9 and in exploded perspective views in FIGS. 10-13. The cable terminating device 305 has a front cover 352 with a female socket 353 of conventional configuration which receives a conventional male plug 354. The main body 351 has a removable lid 355 which permits access to a slot for a screwdriver to permit the front cover to be detached from the main body 351. The lid 355 is used to label the terminal device 305 corresponding to the cable installed in the terminal device.

Housed within the front cover 352 is a contactor plate 357 which has contacts 340 on its front side which engage the plug 354, and knife blades 360 on its rear side which make the electrical contacts with the wires 7 of the cable 8. An apertured cover plate 341 retains the contactor plate 357 engaged with the front cover 352.

The cable 8 is passed from the rear through the cuff 312. Then the individual wires 7 of the cable 8 are located in respective channels 313 which correspond to the knife blades 360. The channels 313 and knife blades 360 preferably have a generally X-shaped layout which makes it easy to place the wires 7 in the desired corresponding one of the channels 313. With the wires 7 located in the channels 313 re-connecting the front cover 352 with the main body 351 results in the knife blades 360 cutting through the installation of the wires 7 and making the desired electrical connections. As before, removal of the front cover 352 from the front of the patch panel 303 enables these wiring connections to be changed without any need to access the rear of the patch panel 303.

The foregoing describes only some embodiments of the present invention and modifications, obvious to those skilled in the electrical wiring arts, can be made thereto without departing from the scope of the present invention. For example, the main body 151, 251 can be arcuate in shape so that the opening 55, 255 is slot shaped rather than being tubular as illustrated.

The term "comprising" (and its grammatical variations) as used herein is used in the inclusive sense of "including" or "having" and not in the exclusive sense of "consisting only of".

While the principles of the invention have been described above in connection with preferred embodiments, it is to be clearly understood that this description is made only by way of example and not as a limitation of the scope of the invention.

The invention claimed is:

1. A patch panel arrangement comprising at least one panel having a front face and a rear face, and having at least one aperture in said patch panel and means to mount the panel in a rack or equivalent mounting structure, wherein said aperture has a cable terminating device therein, said cable terminating device includes a first member which abuts said rear face and a second member which abuts said front face, said second member has a rear surface which abuts said panel front face and a front surface which includes wiring contacts whereby said wiring contacts are accessible from said panel front face.

2. The arrangement as claimed in claim 1 wherein said first and second members include a snap engageable locking means to retain said first and second members engaged and thereby retained in said aperture.

3. The arrangement as claimed in claim 2 wherein said first and second members are each substantially annular, each having an opening through which a cable can pass.

4. The arrangement as claimed in claim 1 wherein said second member engages with a connector body which substantially covers said wiring contacts.

5. The arrangement as claimed in claim 4 wherein said connector body is provided with an outer cover.

6. The arrangement as claimed in claim 5 wherein said connector body comprises a female socket.

7. The arrangement as claimed in claim 1 wherein said cable terminating device is a data or communications connector.

8. A cable terminating device for a patch panel having a front face and a rear face, said device comprising a first member which abuts said rear face, a second member which abuts said front face, said second member has a rear surface which abuts said panel front face and a front surface which includes wiring contacts, and said second member having wiring contacts accessible from said panel front face.

9. The device as claimed in claim 8 wherein said first and second members include a snap engageable locking means to retain said first and second members engaged and thereby retain said device in an aperture of said patch panel.

10. The device as claimed in claim 8 wherein said first and second members are each substantially annular, each having an opening through which a cable can pass.

11. The device as claimed in claim 8 wherein said second member engages with a connector body which substantially covers said wiring contacts.

12. The device as claimed in claim 11 wherein said connector body is provided with an outer cover.

13. The device as claimed in claim 11 wherein said connector body comprises a female socket.

14. The device as claimed in claim 8 and comprising a data or communications connector.

* * * * *